United States Patent [19]

Talmore et al.

[11] Patent Number: 5,021,668
[45] Date of Patent: Jun. 4, 1991

[54] ELECTRO-OPTICAL MIDDLE ULTRA-VIOLET SENSORS

[75] Inventors: Eli Talmore; Ami B. Shalom, both of Kiryat Motzkin, Israel

[73] Assignee: Technion Research & Development FDN. Ltd., Armament Development Authority, Israel

[21] Appl. No.: 464,980

[22] Filed: Jan. 16, 1990

[30] Foreign Application Priority Data

Jan. 16, 1989 [IL] Israel ......................................... 88958

[51] Int. Cl.$^5$ .............................................. G01J 1/42
[52] U.S. Cl. ................................................... 250/372
[58] Field of Search ........................................ 250/372

[56] References Cited

U.S. PATENT DOCUMENTS 3,971,943 7/1976 Jeunehomme et al. ............. 250/372
4,597,629 7/1986 Kraushaar et al. .................. 350/1.6
4,731,881 3/1988 Guller ................................... 250/372

Primary Examiner—Carolyn E. Fields
Assistant Examiner—Drew A. Dunn
Attorney, Agent, or Firm—Ostrolenk, Faber, Gerb & Soffen

[57] ABSTRACT

An electro-optical sensor operative in the middle ultraviolet (UV) region of the electro-magnetic spectrum, and more specifically in the so called "solar blind" region, for the long range detection of flames and artificial light sources. The sensor has a signal sensitivity of a single photon per second and includes an optical filter and an electro-optical detector, such as a photomultiplier, arranged in cascade so that the overall outband response of the sensor satisfies the equation:

$$F^*D = K/A,$$

wherein:

K is the order of magnitude of $10^{-17}$,
F is the average filter transmittance outside the solar blind region;
D is the average detector responsivity outside the solar blind region; and
A is the sensor aperture area (in cm$^2$).

4 Claims, 6 Drawing Sheets

Hydrogen fire radiation spectrum, replotted from data supplied by NASA.

Hydrogen fire radiation spectrum, replotted from data supplied by NASA.

Spectrum of the high pressure mercury lamp and Pen-ray lamp.

Atmospheric transmittance in middle UV over 1 Km horizontal path under typical atmospheric conditions.

ELECTRO-OPTICAL MIDDLE ULTRA-VIOLET SENSORS

BACKGROUND OF THE INVENTION

The present invention concerns electro-optical sensors operating in the middle ultra-violet (UV) region of the electromagnetic spectrum, and more specifically in the so called "solar blind" region, namely the range between 230 nm and 280 nm wavelengths. Such sensors are generally known, mostly used for the detection of flames e.g. forest fires and artificial light sources.

The name "solar blind" derives from the known fact that the ozone layer in the stratosphere completely absorbs the solar radiation of wavelengths below 280 nm - as represented by the most lefthand shaded area in the Solar Spectral Irradiance at sea level curve of FIG. 1a. The lower limit of 230 nm is determined by the edge of the Shumann-Runge oxygen absorption band.

Even though it is well known that conventional electro-optical "solar blind" sensors have an operational advantage over sensors operating in longer wavelength ranges, in that even under the most stringent daylight conditions their operation remains largely unaffected by background noise, it is the major object of the present invention to provide a sensor whose responsivity is boosted to a signal sensitivity of a single photon per second, thereby considerably improving its performance.

SUMMARY OF THE INVENTION

General constructional and operational features and structures of UV solar blind detectors appear in the relevant literature (see, for example, U.S. Pat. No. 4,731,881) and need not be described in greater detail.

It will be thus evident that solar blind sensors essentially comprise an optical filter and an electro-optical detector in the form of a photomultiplier (PMT), in a cascade arrangement.

Each of these two components usually possesses a different spectral responsivity vs. wavelength characteristic. Since it is not feasible that any one component will present a strictly 0 (zero) responsivity from 280 nm throughout the near ultra-violet, visible and infra-red portions of the spectrum, the only practical way to achieve such a responsivity, to incoming solar radiation, is by determining that the overall sensor response will produce the required negligible signal.

In order to achieve the desired sensitivity of 1 photon/sec within the 230-280 nm region, the overall sensor response to solar radiation in the 280-3000 nm region ("outband" response) must not exceed 1 photon/sec. This condition can be expressed by the spectral integral given in the first approximation by the equation:

$$E^*A^*F^*D = 1 \quad (1)$$

where
E is the average solar flux in photons/sec/cm$^2$,
A is the sensor aperture area in cm$^2$,
F is the average filter transmittance outside the solar blind region, and
D is the average detector responsivity (efficiency) outside the solar blind region.

Since the solar radiation that reaches the sensor depends on the prevailing atmospheric conditions, it is deemed sufficient, for all practical purposes, to deal with order-of-magnitude calculations only. Therefore, considering that the average solar flux at sea level is approximately 1 Kw/m$^2$ = 0.1w/cm$^2$ = 10$^{17}$photons/sec/cm$^2$ (see chart shown in FIG. 1b), the equation for the response of the sensor, with aperture A cm$^2$, becomes:

$$F^*D = K/A \quad (2)$$

wherein K is in the order of magnitude of $10^{-n}$.

Equation (2) means that a sensor of an aperture of 1 cm$^2$ should have an average response of $10^{-17}$ outside the 230-280 nm region in order to qualify as "solar blind".

Evidently a sensor of 100 cm$^2$ aperture must have a 100 times lower "outband" response.

Obviously, the required response F*D can be achieved by an infinite number of combinations of F and D factors, depending on the available equipment being used or developed for this or different purposes. Thus, for example, one can use the following combination of filter and detector devices: CsTe photocathode photomultiplier similar to R431S from Hamamatsu Corp., and combinations of doped glasses, crystals and thin films, known in the art as "Barr filter" (see for example "The Middle Ultraviolet: Its Science and Technology", A.E.S.Green, John Wiley and Sons (1966), pp. 332-345). There are many other variations of such filters to be tailored for specific detector performances in order to comply with Eq. (2).

The invention thus consists of an electro-optical sensor comprising, in combination, an optical filter and an electro-optical detector arranged in cascade so that the overall outband response of the sensor (as hereinbefore defined) satisfies the equation:

$$F^*D = K/A,$$

wherein:
K is in the order of magnitude of $10^{-17}$;
F is the average filter transmittance outside the solar blind region;
D is the average detector responsivity outside the solar blind region; and
A is the sensor aperture area (in cm$^2$).

BRIEF DESCRIPTION OF THE DRAWINGS

Constructional details, advantages and applications of the present invention will become more fully appreciated in the light of the ensuing description of a preferred embodiment thereof, given by way of example only, with reference to the accompanying drawings, wherein.

DETAILED DESCRIPTION OF THE DRAWINGS

Figure 1A:
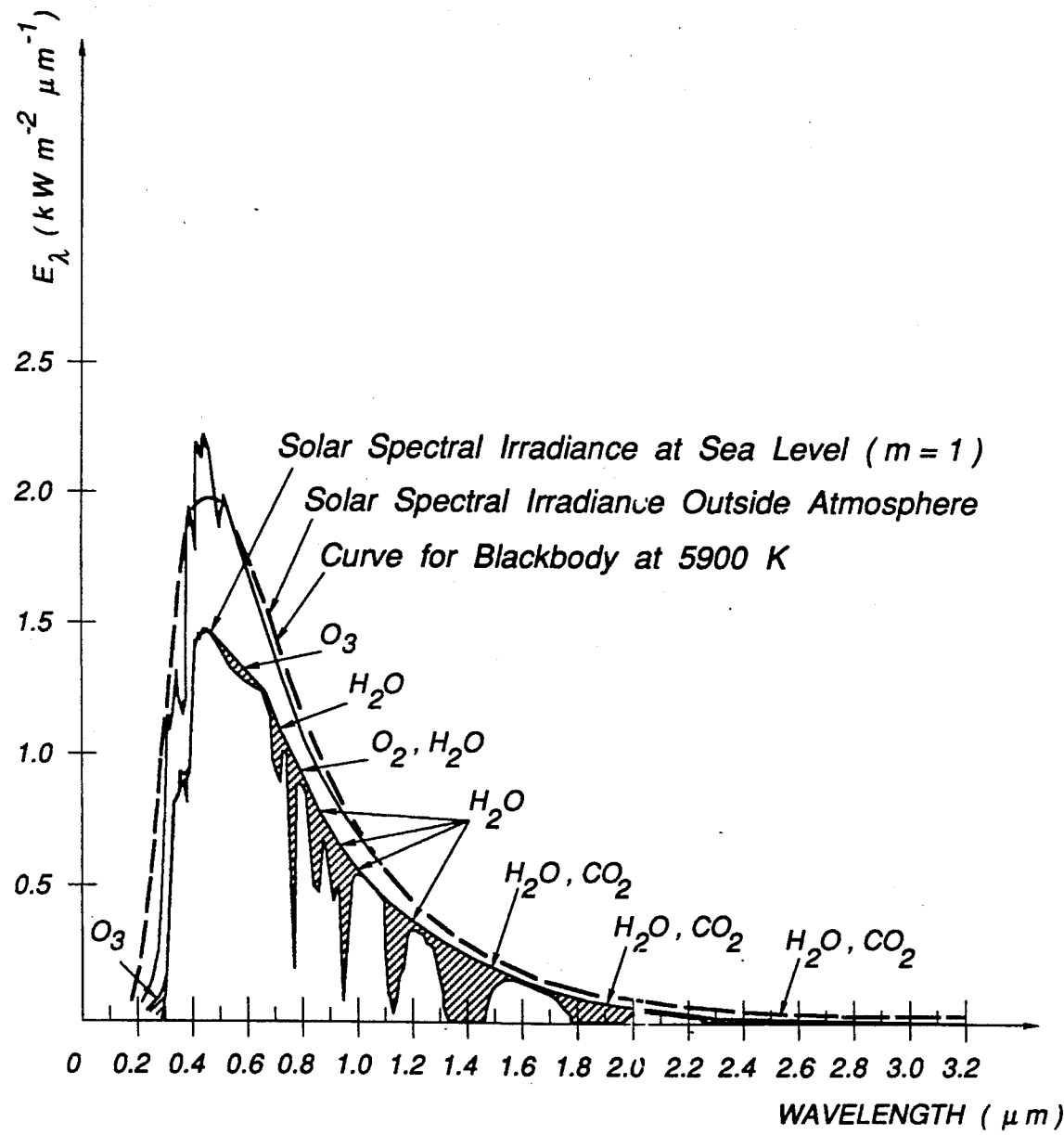
FIG. 1a is a chart showing Solar Spectral distribution curves.
Figure 1B:
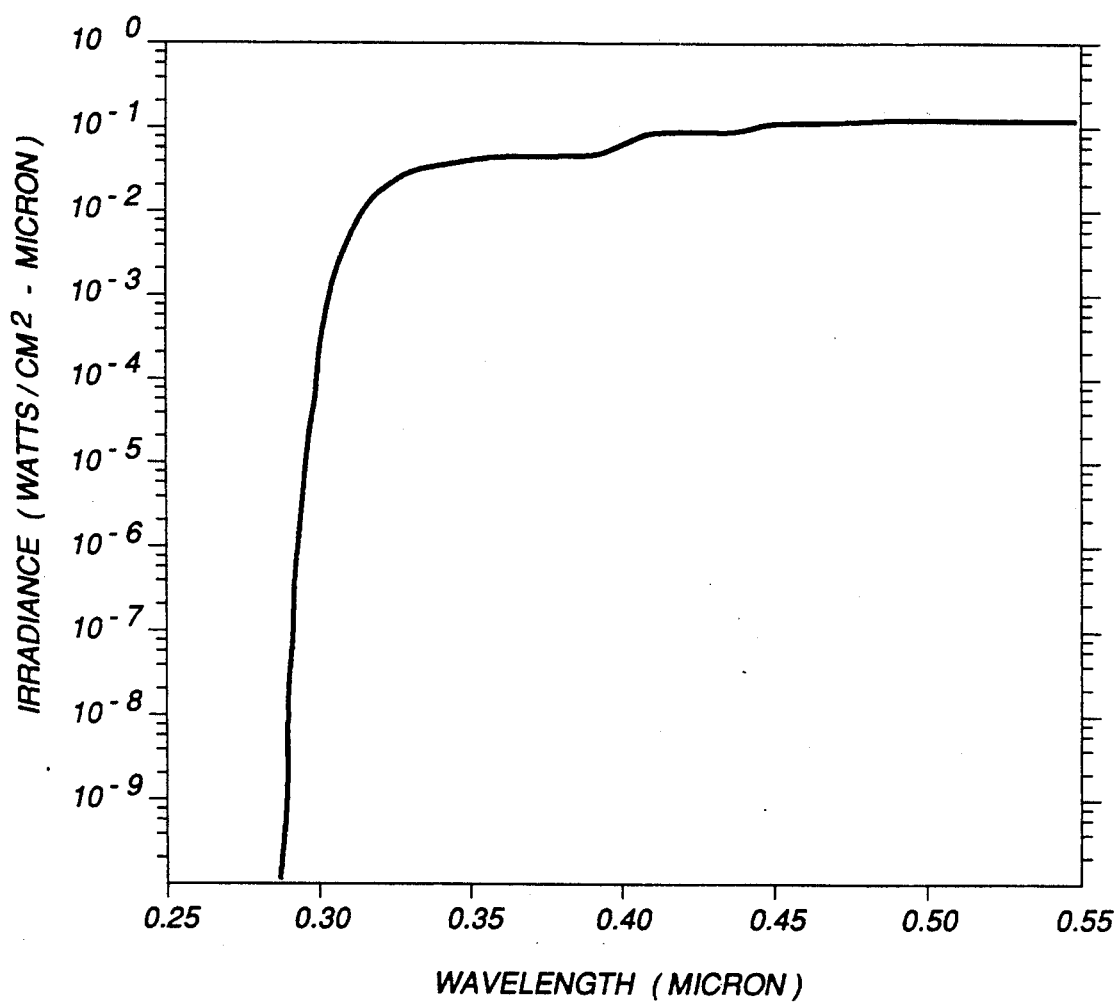
FIG. 1b is a graph showing the solar irradiance flux as a function of wavelength.
Figure 2:
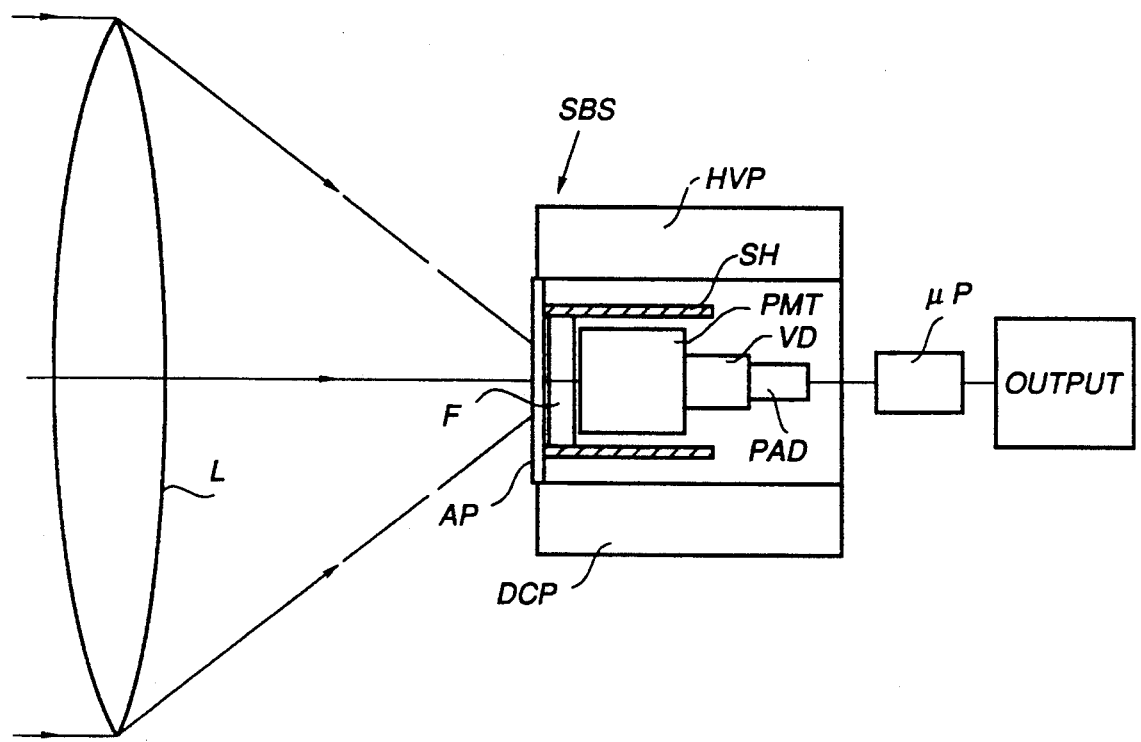
FIG. 2 is a schematic component view of a sensor according to the present invention.

For better understanding of the invention and the manner of reducing same into practice, reference shall be made to FIG. 2 of the attached drawings, schematically illustrating the basic construction of a sensor which may be adapted to embody the teachings of the present invention.

The solar blind UV sensor, generally designated SBS, consists of a collecting optic in the form of UV quartz lense L, however, use of other similar elements—such as a mirror, either stationary or rotating—is applicable as well. A filter marked F with aperture AP is located at the focal plane of the lense L for applying the incoming radiation onto a photomultiplier PMT coupled in cascade thereto. The performance characteristics of the filter F and PMT are selected so that the overall response of the combination of the two components satisfies Eq. (2) above.

A high voltage power supply HVP is provided for the supply of the necessary voltage distribution to the PMT, preferably including a voltage divider designated VD.

A preamplifier-discriminator PAD is used to amplify, shape and discriminate the output signal of the PMT. This unit enables the method of single photon pulse counting.

A radio-frequency, electrostatic and magnetic shield SH envelops the unit, to prevent noise interference with the PMT operation.

A DC power supply DCP is provided for the PAD operation.

The output detected signals of the sensor are processed by microprocessor, $\mu P$ and are displayed on any suitable device, denoted OUTPUT (e.g. monitor, audio or visual alarm and the like).

Figure 3:
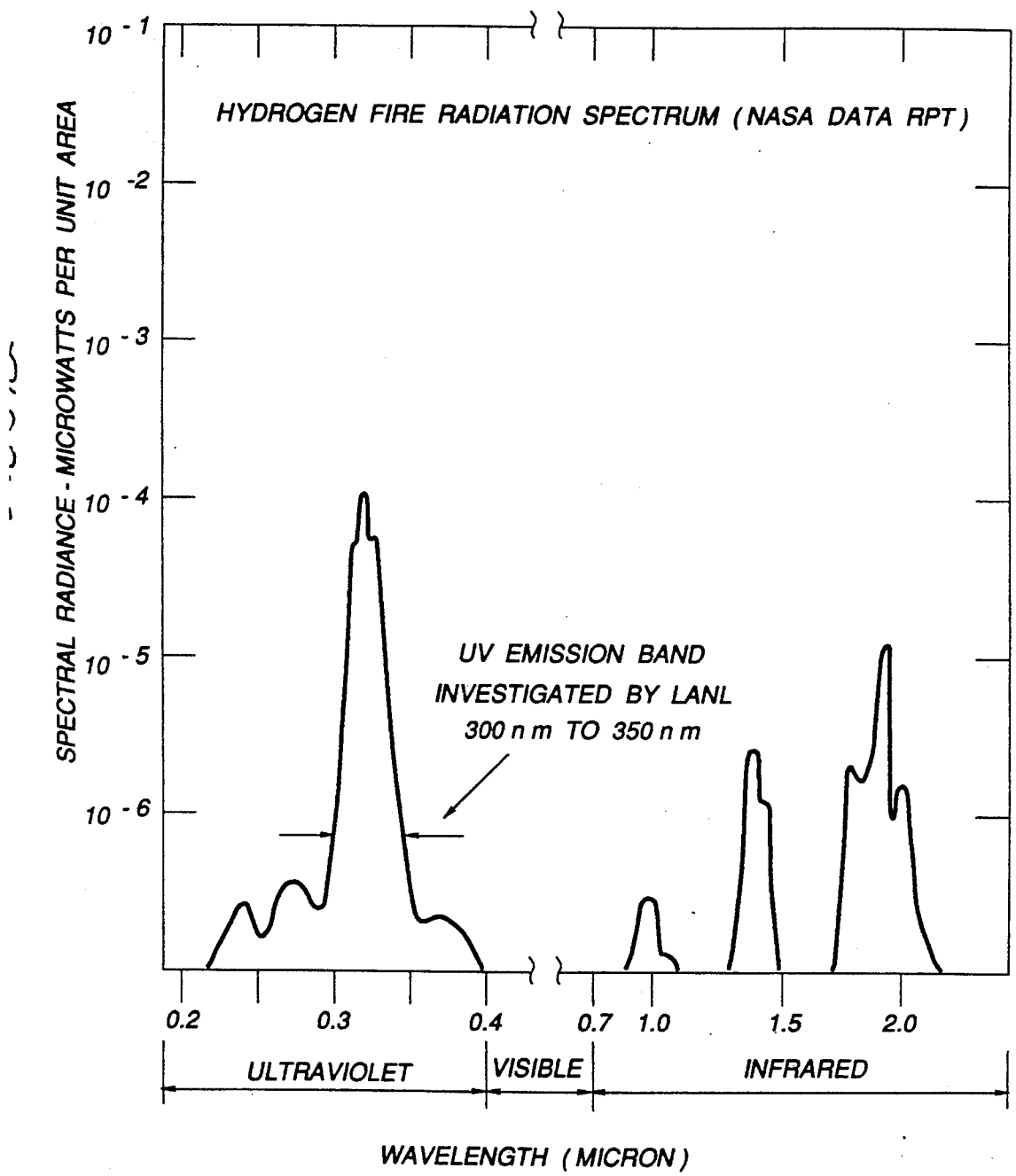
FIG. 3 is a chart showing the emission spectrum of an oxygen-hydrogen fire.
Figure 4:
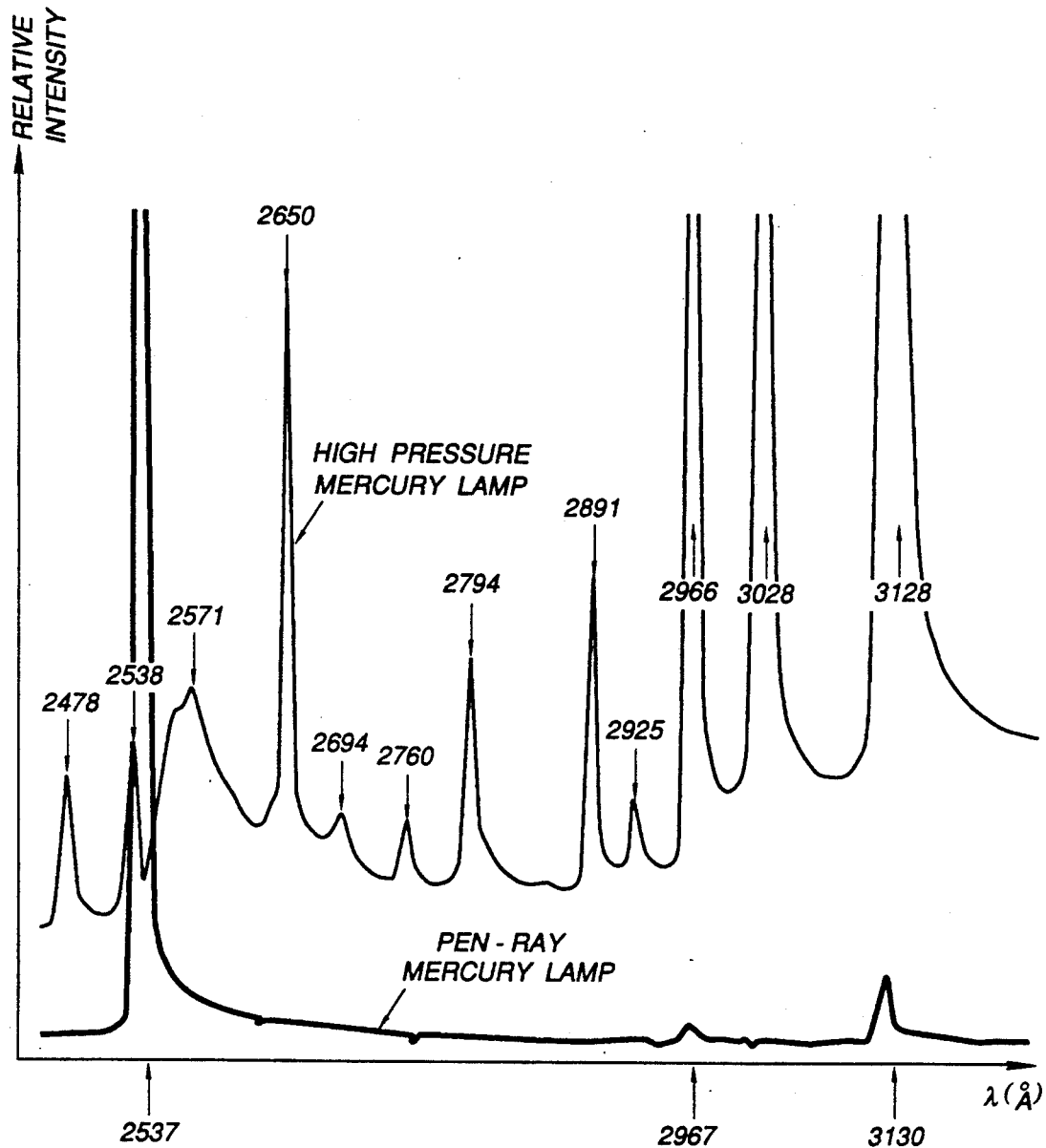
FIG. 4 is a chart showing the emission spectrum of two artificial light sources.

The sensor SBS, proposed by the present invention, is an ultimately sensitive device capable of detecting any kind of flame or artificial light source, that has a sufficient emission in the middle UV spectral region. For example, as shown in the chart of FIG. 3, the emission spectrum of an oxygen-hydrogen fire includes a considerable portion of the total radiation emission in the middle UV bandwidth, while the charts of FIG. 4 show two relevant light sources, namely a High-pressure and a Low-pressure (pen-ray) mercury lamps, emitting radiation mainly in the middle UV bandwidth.

Figure 5:
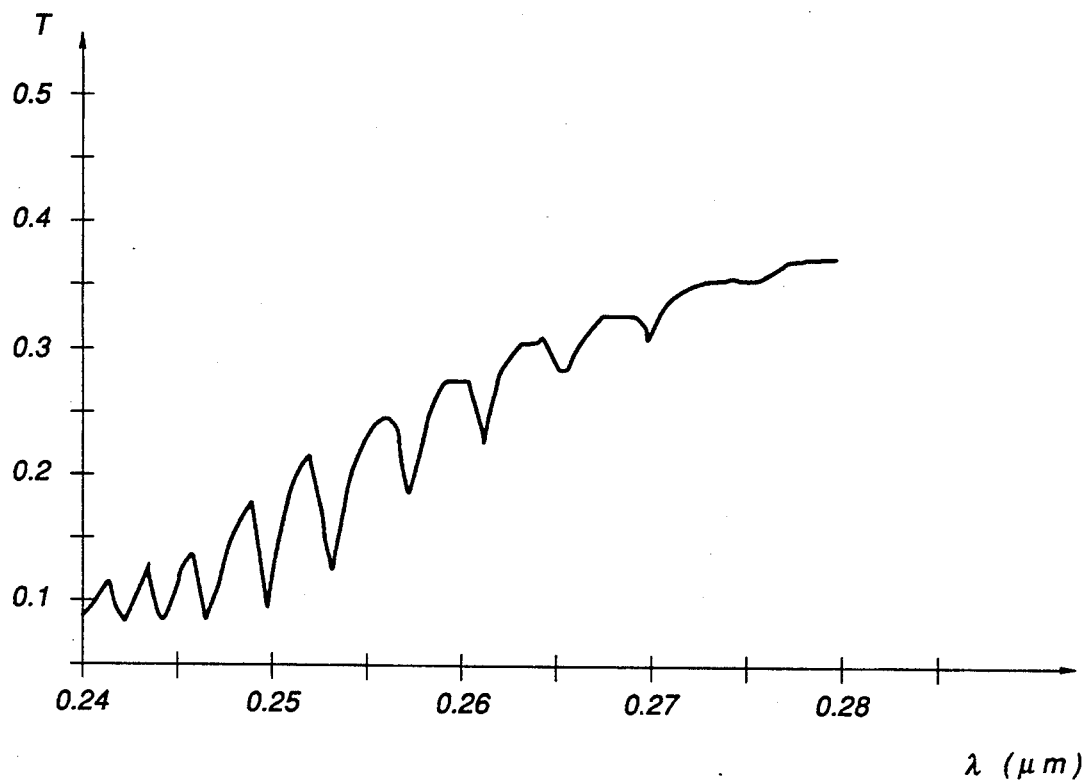
FIG. 5 is a graph showing atmospheric transmittance as a function of wavelength.

The calculation of the sensitivity of the sensor SBS, (assuming a filter transmittance of 0.1, detector responsivity (efficiency) of 0.1, and an optical aperture of 20 cm$^2$) for the detection of a forest fire of intensity $I=1$ Watt/steradian in the middle UV bandwidth, over a distance of $R=5$ km, under average ambient atmospheric transmittance conditions of $T=0.3$ per 1 (one) Kilometre (see FIG. 5), is performed in the following manner.

The total flux E falling on the detector, over a distance 1 km, is governed by:

$$E = I*T/R^2 \qquad (3)$$

yielding a flux E, on substitution of the above values, falling on the sensor of:

$$E = 10^{18}*0.3^5(5*10^5)^2 = 9720 \text{ photons/sec/cm}^2$$

Hence, on applying Eq. 1, the sensor SBS will register a signal S $$S = 9720*20*0.1*0.1 = 1944 \text{ counts/sec}$$

Since typical noise (dark current) of the PMT detector is $N=10$ counts/sec, the expected signal-to-noise (S/N) ratio is nearly 200, thereby enabling a confident detection of the forest fire at the above stated distance of 5 km.

In many applications however, a mere detection is not sufficient, and some sort of additional identification is necessary. In such cases, temporal information may be utilized, for which the necessary signal processing thereof is then performed using the microprocessor $\mu P$. For example, a high-pressure mercury lamp operating under 220 V mains current has a specific "signature" of about 100 Hz, while a fire is known to "flicker" at the frequency of 1–20 Hz.

Following the Nyquist theorem, in order to identify a frequency of 100 Hz, one must sample an incoming signal at least twice in a period of 10 msec, i.e. sampling time of at most 5 msec. Therefore, using the sensor data above, applied to a high-pressure mercury lamp, having a 1 Watt/ster intensity in the middle UV bandwidth, over distance of 5 km, the expected output signal will be: $S(5 \text{ msec}) = 1944*0.005 = 10$ counts The probability to otherwise obtain this number of counts at random is absolutely negligible thereby enabling identification of the lamp with a high degree of confidence.

The invention thus provides a most effective, sensitive, accurate and reliable measuring tool for extremely low radiation emission loads in the relevant bandwave that has applications in a variety of fields.

Those skilled in the art to which the present invention pertains will appreciate that numerous modifications and variations may be applied without departing from the scope of the invention as defined in and by the appended claims.

What is claimed is:

1. An electro-optical sensor, for the middle ultra-violet comprising, in combination, an optical filter and an electro-optical detector arranged in cascade characterised by the overall outband response of the sensor (as hereinbefore defined) satisfying the equation:

$$F*D = K/A, \text{ wherein:}$$

K is in the order of magnitude of $10^{-17}$;
F is the average filter transmittance outside the solar blind region;
D is the average detector responsivity outside the solar blind region; and
A is the sensor aperture area (in cm$^2$).

2. A sensor as claimed in claim 1 further comprising a voltage divider coupled to a preamplifier.

3. A sensor as claimed in claim 2 further comprising an RF, electrostatic and magnetic shield surrounding the filter and detector.

4. A sensor as claimed in claim 3 comprising an UV quartz lens for focusing radiation onto the filter.

* * * * *